(12) United States Patent
Shelton (10) Patent No.: US 7,887,700 B2
(45) Date of Patent: Feb. 15, 2011

(54) LEVEL-COMPENSATING SURFACE SKIMMING DEVICE

(76) Inventor: Marlin Shelton, 902 E St., Lenoir City, TN (US) 37771

( * ) Notice: Subject to any disclaimer, the term of this patent is extended or adjusted under 35 U.S.C. 154(b) by 1059 days.

(21) Appl. No.: 11/621,153

(22) Filed: Jan. 9, 2007

(65) Prior Publication Data

US 2008/0164198 A1    Jul. 10, 2008

(51) Int. Cl.
B01D 21/30    (2006.01)
C02F 1/40    (2006.01)

(52) U.S. Cl. ............ 210/242.1; 210/144; 210/241; 210/242.3; 210/776

(58) Field of Classification Search .......... 16/2.2; 210/242.1
See application file for complete search history.

(56) References Cited

U.S. PATENT DOCUMENTS

| | | | |
|---|---|---|---|
| 1,032,458 A | | 7/1912 | White |
| 2,608,300 A | * | 8/1952 | Small ............ 210/242.3 |
| 3,702,134 A | * | 11/1972 | Henning et al. ......... 210/242.3 |
| 4,085,049 A | | 4/1978 | Hartwick et al. |
| 4,288,324 A | | 9/1981 | Urdanoff |
| 4,405,458 A | | 9/1983 | McHugh, Jr. |
| 4,554,079 A | | 11/1985 | Wingard et al. |
| 4,645,974 A | * | 2/1987 | Asai ................... 315/50 |
| 4,693,821 A | | 9/1987 | Goronszy et al. |
| 5,059,312 A | | 10/1991 | Galletti |
| 5,498,348 A | | 3/1996 | Plink et al. |
| 5,601,705 A | | 2/1997 | Glasgow |
| 5,897,773 A | | 4/1999 | Rhodes |
| 6,287,460 B1 | | 9/2001 | Van Schie |
| 6,488,841 B2 | | 12/2002 | Glasgow |

* cited by examiner

*Primary Examiner*—Krishnan S Menon
*Assistant Examiner*—Allison Gionta
(74) *Attorney, Agent, or Firm*—Knox Patents; Thomas A. Kulaga (57) ABSTRACT

An apparatus for skimming the top surface of a pool of fluid with a constant flow rate regardless of level changes of the fluid. A storage tank and a suction port are positioned at opposite ends of a conduit that connects the tank and the port. The conduit pivots about a pivot point such that the storage tank elevation follows the fluid level, which allows the suction port to be positioned at the surface of the fluid. In various embodiments, the pivot for the conduit is attached to a pump resting on the bottom of the tank, is formed by a pair of floats, is a pivot mechanism attached to a wall penetration of a tank, or is a flexible hose that allows the conduit to move.

13 Claims, 6 Drawing Sheets

LEVEL-COMPENSATING SURFACE SKIMMING DEVICE

BACKGROUND OF THE INVENTION

1. Field of Invention

This invention pertains to a skimmer for removing surface contaminates from the top layer of a body of liquid. More particularly, this invention pertains to a surface skimmer that compensates for changes in fluid level while maintaining a constant flow of fluid.

2. Description of the Related Art

Various types of skimmers are known in the art, including disk, drum, and those with flotation devices. With respect to the skimmers that operate with varying water levels, there are two types of skimmers: those that are adjusted, either manually or automatically, to the water level and those that use floats to compensate for changes in water level. An example of an adjustable skimmer is disclosed in U.S. Pat. No. 4,693,821, titled "Weir for waste water treatment systems."

Of the second type of skimmer that uses flotation devices, there are two different classes of float type skimmers. The first class are those that use the float solely to position the skimmer inlet near the surface of the water. The second class are those that have a float that compensates for the water level and for the flow rate of the skimmer.

There are examples of the first class, which use floats only to compensate for water level changes. U.S. Pat. Nos. 1,032,458; 5,059,312; 5,498,348; and 5,897,773 illustrate examples of devices within the first class. There are examples of the second class in which the skimmer compensates for not only the water level but for the rate of flow from the skimmer. For example, U.S. Pat. No. 2,608,300 discloses a floating, pivoting tank with a weir. When the flow out of the device exceeds the liquid flow over the weir, the tank pivots such that the weir is lowered, thereby causing more liquid to flow over the weir and into the tank.

U.S. Pat. No. 3,702,134 discloses a skimming apparatus 10 with an inlet 18 at one end of a pivoting assembly. Opposite the inlet 18 is a counterbalancing duct 26 that is open to the atmosphere through a vent line 32. When the flow through the inlet 18 is less than the outlet flow of the skimming apparatus 10, the fluid in the counterbalancing duct 26 decreases and causes the inlet 18 to lower into the fluid whereby more fluid enters the inlet 18 and flows into the counterbalancing duct 26.

U.S. Pat. No. 4,085,049 discloses a skimming device 10 with a floating frame 12 and an open-sided cylinder 24. The cylinder 24 rotates about a pivot point 8 that is offset towards the open weir edge 26. As the cylinder 24 fills with fluid, the cylinder 24 rotates, thereby causing the weir edge 26 to rise relative to the surface of the fluid. As the fluid in the cylinder 24 is pumped out, the cylinder 24 empties and rotates such that the weir edge 26 is lowered into the fluid.

U.S. Pat. No. 4,288,324 discloses a skimming system 10 with a truncated ovoidal-shaped compartment 16 that has a horizontal pivotal axis 20 that moves a lip 17 up or down depending upon the amount of fluid contained in the compartment 16. When the fluid is removed from the compartment 16 faster than the fluid flows over the lip 17, the fluid level in the compartment 16 drops, causing the compartment 16 to rotate and the lip 17 to move lower, thereby allowing more fluid to enter the compartment 16.

U.S. Pat. No. 4,405,458 discloses a weir collar 1 that is nested within a fixed guide collar 2. Inside the weir collar 1 is a float chamber 4 that allows the weir collar 1 to slide within the fixed guide collar 2 such that the top edge of the weir collar 1 is even with the level of the fluid 14 inside the fixed guide collar 2 and the weir collar 1.

U.S. Pat. No. 4,554,079 discloses a cylindrical collection chamber 3 with a front pod 9 and a rear pod 13. The pods are mounted below the waterline. The front pod 9 is sealed, but the rear pod 13 is in fluid communication with the collection chamber 3. The collection chamber 3 has an inlet 5 in the front of the chamber 3. As the chamber 3 and the rear pod 13 fill with fluid, the rear pod 13 looses buoyancy, causing the collection chamber 3 to rotate such that the inlet 5 is elevated above the waterline. The collected fluid is removed from the device 1, thereby causing the inlet 5 to rotate towards the waterline so that the collection chamber 3 can refill with fluid.

U.S. Pat. No. 5,601,705 discloses a skimmer 12 that includes one float 76 for compensating for varying fluid levels and second float 58 for adjusting for rate of flow through the skimmer 12. The second float 58 operates within a chamber 30 and causes an intake pipe 48 to rotate, thereby varying the size of the inlet 86.

U.S. Pat. No. 6,287,460 discloses a collecting container 1 with triangular side walls 5 and 6. The collecting container 1 is tiltable and has a pipe 7 for removing collected fluid. As the collecting container 1 fills with fluid, the container 1 tilts because the back end loses buoyancy and the front end lifts out of the fluid, thereby limiting the flow of fluid into the container 1. As the fluid is pumped out of the container 1, the container 1 gains buoyancy and the container 1 tilts such that the fluid flow into the container 1 increases.

U.S. Pat. No. 6,488,841 discloses a skimmer with two floats 60, 62 that follow the fluid level as it varies. Another float 86 is inside a supply container 72 and operates an adjuster 80 that varies the size of an inlet 76. As the pump 34 draws down the fluid level in the container 72, the float 86 causes the adjuster 80 to fall, thereby increasing the size of the inlet 76 and filling the container 72 and maintaining a supply of fluid to the pump 34.

BRIEF SUMMARY OF THE INVENTION

According to various embodiments of the present invention, a level-compensating surface skimming device is provided. The skimmer includes a suction port and a storage tank connected with a conduit. The inside of the storage tank is exposed to the atmosphere above the surface of the fluid. The conduit pivots about an axis that is parallel to and below the plane of the surface of the fluid. In one embodiment, the pivot point of the conduit is attached to a pivoting member that is a part of the pump, which is a submersible pump positioned on the floor of the tank containing the skimmer. The pivoting conduit with the suction port and storage tank form a seesaw-type structure. A suction line is attached to the conduit and the suction line is connected to the input of a fluid pump.

In operation, the fluid pump applies suction to the skimmer and draws any fluid stored in the storage tank. As the storage tank empties, the storage tank moves up in the fluid due to flotation and the suction port correspondingly moves down. When the suction port moves below the surface of the fluid, the fluid flows into the suction port and the skimmer becomes a dynamic system. The fluid flows into the conduit and into the storage tank. The fluid is also removed from the skimmer by the pump. If the rate of removal of fluid is less than the flow of fluid into the suction port, then the storage tank begins to fill, which causes it to sink in the fluid. The sinking storage tank causes the suction port to rise above the surface of the fluid, thereby stopping the flow of fluid into the skimmer. The only source of fluid left for the pump is in the storage tank, which the pump begins to draw down, thereby causing the storage tank to rise and the suction port to sink. After the suction port sinks below the surface of the fluid, the fluid begins to fill the storage tank, thereby causing the storage tank to fall. The skimmer outlet to the pump always provides fluid to the pump because either the storage tank contains fluid or the suction port is below the surface of the fluid and fluid flows. Accordingly, the skimmer self-primes the pump.

In an undamped state, the storage tank and suction port oscillate up and down. Because of the mass of the components and the friction of the pivot mechanism, the skimmer stabilizes with the suction port positioned at a level where the fluid received by the suction port is equal to the fluid pulled by the pump. In the stable state, when the fluid level changes, the storage tank moves due to its buoyancy until the skimmer reaches a new stable state. Accordingly, the skimmer continues to draw down the top surface of the fluid regardless of level changes of the fluid.

In one embodiment, the skimmer is a floating skimmer. In such an embodiment, the conduit is attached to a pair of floats connected by an arm. The center of the arm is rigidly attached to the pivot point of the conduit. A flexible hose is in fluid communication with the conduit and the pump. The floats have sufficient buoyancy to maintain the pivot point of the conduit below the surface of the water. The pivoting action results from the floats moving in the fluid.

In still another embodiment, the conduit, storage tank, and suction port are within a fluid tank. The conduit is connected to a pivot mechanism, which is connected to a pipe penetrating the fluid tank wall. The pump is located outside the fluid tank. Such an embodiment is suited to skimming fluid in a coolant tank or other tank with environmental conditions not suitable for the pump.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for skimming the top layer of fluid from a pool of fluid is disclosed. Skimmers have many diverse applications, including removing scum from swimming pools and removing oil from machine coolant. In various embodiments, the skimmer 100 is used to collect debris, waste, floating oil, dirt, and/or other fluid-borne material. The collected material is pumped for collection, reprocessing, or treatment.

Figure 1:
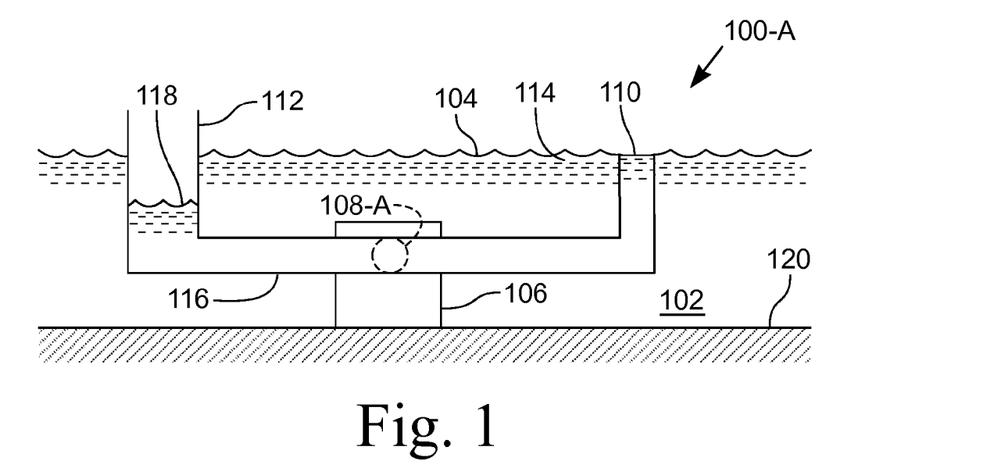
FIG. 1 is a side symbolic view of one embodiment of a skimmer in a shallow pool of fluid.

FIG. 1 illustrates a side symbolic view of one embodiment of a skimmer 100-A in a shallow pool of fluid 102. The skimmer 100-A includes a suction port 110 at one end of a conduit 116. A storage tank 112 is positioned at the other end of the conduit 116. The suction port 110, conduit 116, and storage tank 112 have a generally U-shape. The suction port 100 is configured to receive fluid 102 from the top layer 114 of the fluid 102. The storage tank 112 is configured to receive and store fluid 102. The tank 112 is exposed to the atmosphere above the surface 104 of the fluid 102. The open storage tank 112 prevents the formation of a differential pressure between the tank 112 and the atmosphere above the surface 104 of the fluid 102. Accordingly, the fluid 102 freely enters the tank 112 from the suction port 110.

Attached to the conduit 116 is a pivot mechanism 108-A that allows the conduit 116 to move with a seesaw-like motion, which moves the storage tank 112 and the suction port 110 vertically in opposite directions. The skimmer 100-A pivots based on the buoyancy of the storage tank 112. The buoyancy of the storage tank 112 is dependent upon the fluid level 118 contained inside the storage tank 112.

In the illustrated embodiment, the skimmer 100-A is in fluid communication with a pump 106 through the pivot mechanism 108-A. The pivot mechanism 108-A in this embodiment performs the function of pivoting the skimmer and the function of providing a fluid connection between the skimmer 100-A and the pump 106. The pump 106 is a submersible-type pump adjacent to the bottom 120. In one such embodiment, the pump 106 is a centrifugal pump that is primed by the skimmer 100. That is, the pump 106 is not required to be self-priming because the skimmer 100 provides a positive head of fluid to the intake 402 of the pump 106. The fluid 102 that enters the suction port 110 and is stored in the storage tank 112 is fed by gravity to the pump 106 from the outlet of the conduit 116.

In one embodiment, the pump 106 is ballast that holds the skimmer 100-A in a fixed position in the pool of fluid 102. That is, the weight of the pump 106 holds the skimmer 100-A in position on the bottom 120. In another embodiment, the pump 106 is secured to the bottom, or floor, 120.

Figure 2:
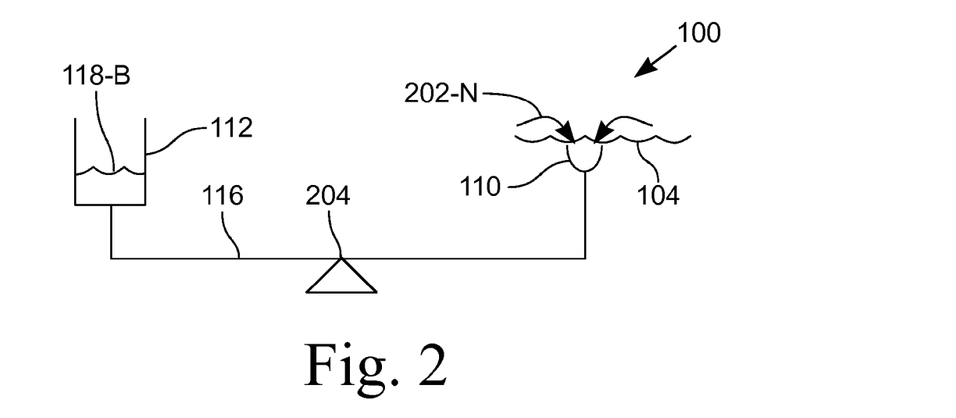
FIG. 2 is a schematic view of the skimmer at equilibrium.

FIG. 2 illustrates a schematic view of a skimmer 100 at equilibrium, that is, with a constant, or normal, flow 202-N of fluid 102 into the suction port 110. The conduit 116 is balanced at a pivot point 204 such that the weight, or buoyancy of the partially filled storage tank 112 is balanced with the weight of the suction port 110. The fluid level 118-B in the storage tank 112 is at a level that balances the skimmer 100 on the pivot point 204. In the illustrated balanced configuration, the flow 202-N into the suction port 110 is equal to the suction flow 406 drawn by the pump 106.

The phrase "pivot point" 204 is used herein to refer to the location on the conduit 116 between the storage tank 112 and the suction port 110 where the conduit 116 pivots or rotates. One skilled in the art will recognize that the pivot point 204 also refers to the axis of rotation about which the conduit 116 pivots. Accordingly, the phrase pivot point 204 is interchangeable with the phrase pivoting axis and the term pivot.

Figure 3:
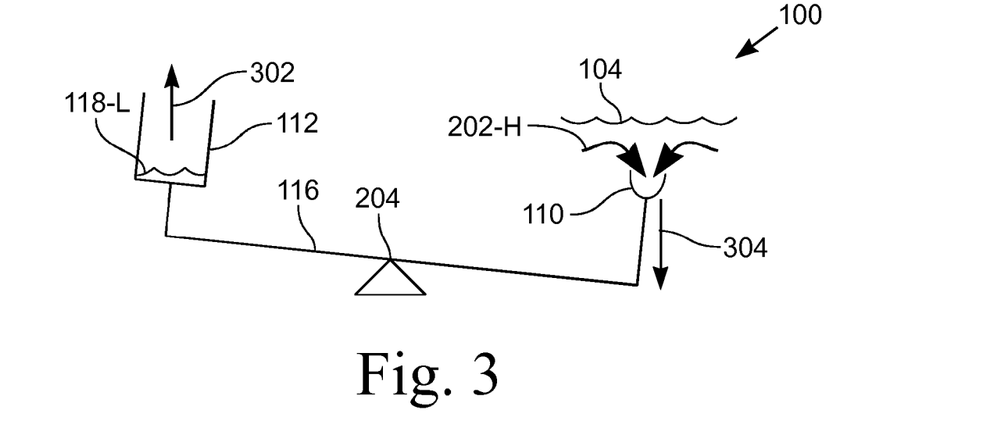
FIG. 3 is a schematic view of the skimmer in an unbalanced condition.

FIG. 3 illustrates a schematic view of the skimmer 100 in an unbalanced condition with the suction port 100 below the surface 104 of the fluid 102. In the illustrated configuration, the fluid level 118-L in the storage tank 112 is too low to balance the skimmer 100 on the pivot point 204. Consequently, the storage tank 112 has moved upwards 302, thereby causing the suction port 110 to move downwards 304. Because the suction port 110 has moved downwards 304 below the surface 104 of the fluid 102, a high rate of fluid flow 202-H enters the suction port 110. The high rate of fluid flow 202-H is greater than the suction flow 406 of the pump 106 and the excess flow 202-H enters the storage tank 112, causing the tank's fluid level 118-L to rise. With more fluid 102 in the storage tank 112, the tank 112 becomes less buoyant and the tank 112 begins to sink in the fluid 102, which causes the suction port 110 to rise to the surface 104 of the fluid 102, which reduces the high rate of fluid flow 202-H into the suction port 110 to a normal rate of fluid flow 202-N, which results in a balanced condition of the skimmer 100. If the tank 112 continues to sink, the suction port 110 is consequently moved upward and out of the fluid 102. At this point, the pump 106 begins drawing fluid 102 from the storage tank 112 and not the suction port 110.

Figure 4:
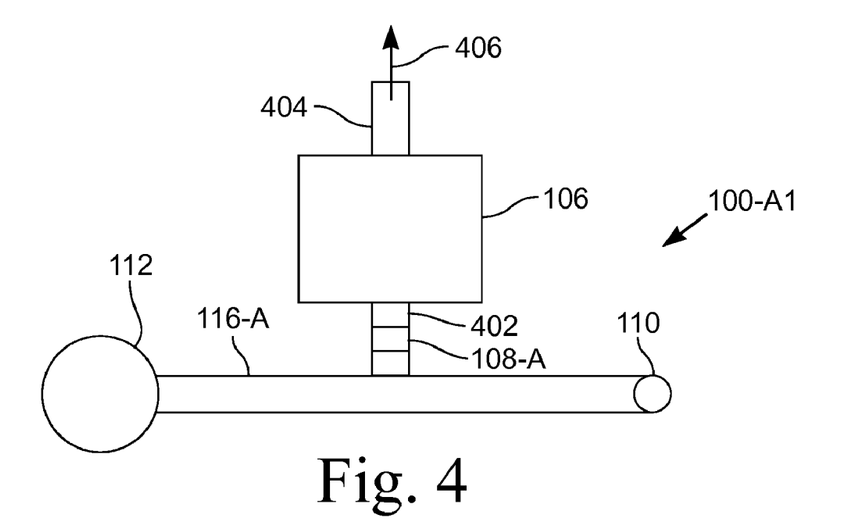
FIG. 4 is a top view of one embodiment of a skimmer with a submersible pump.

FIG. 4 illustrates a top view of one embodiment of a skimmer 100-A1 with a submersible pump 106. The conduit 116-A is a straight section of pipe that connects the storage tank 112 and the suction port 110. The conduit 116-A is connected to the pivot mechanism 108-A, which in turn is connected to the intake 402 of the pump 106. The outlet 404 of the pump 106 has a flow 406, which is equal to the flow from the outlet of the skimmer 100.

The pump intake 402 is a stationary section of pipe that is attached to the pivot mechanism 108-A. The pivot mechanism 108-A enables the pump 106 to be stationary on the bottom 120 and the conduit 116 to pivot about the rotational axis of the pivot mechanism 108-A.

In the illustrated embodiment, the storage tank 112 is an open-ended cylinder with the conduit 116 connected to the lower end of the cylinder. The suction port 110 is an open-ended pipe. In various embodiments, the opening of the suction port 110 is flat and parallel to the surface 104, angled such that one side of the suction port 110 is lower than the opposite side, or has a serrated edge.

Figure 5:
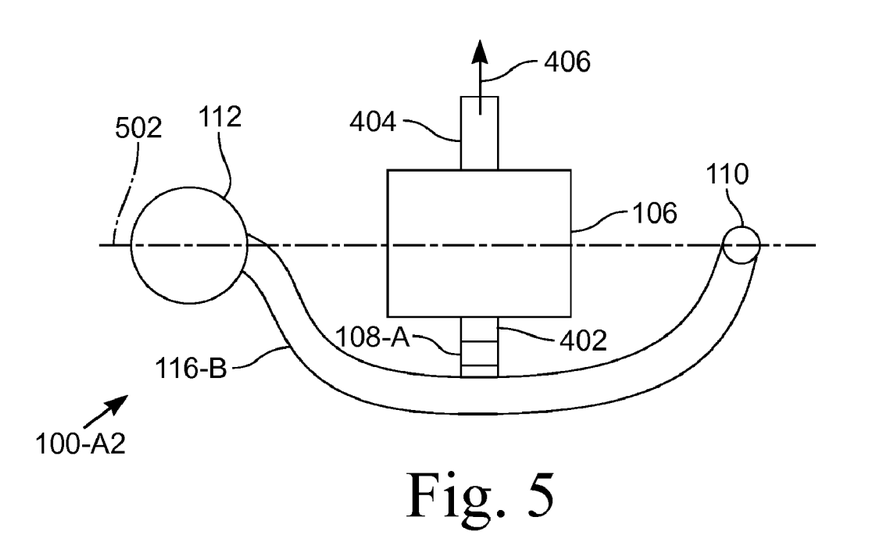
FIG. 5 is a top view of another embodiment of a skimmer with a submersible pump.

FIG. 5 illustrates a top view of another embodiment of a skimmer 100-A2 with a submersible pump 106. In the illustrated embodiment, the conduit 116-B has an arcuate shape when viewed from above. The arcuate shape of the conduit 116-B aligns the center of the storage tank 112 and the suction port 110 with the centerline 502 of the pump 106. This embodiment of the skimmer 100-A2 reduces the overall footprint of the skimmer 100-A2 compared to the embodiment of the skimmer 100-A1 illustrated in FIG. 4.

Figure 6:
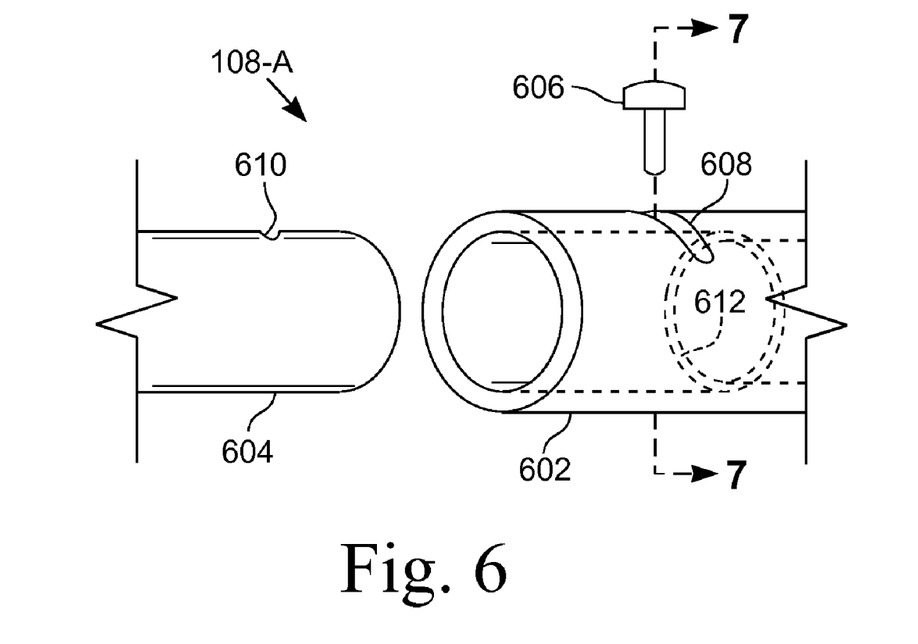
FIG. 6 is a perspective view of one embodiment of a pivoting fluid connection.
Figure 7:
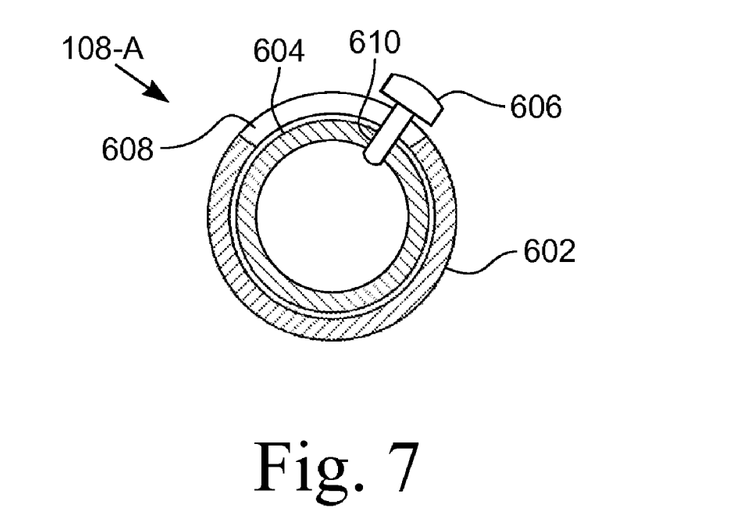
FIG. 7 is a cross-sectional view of one embodiment of a pivoting fluid connection.

FIG. 6 illustrates a perspective view of one embodiment of a pivoting fluid connection 108-A. FIG. 7 illustrates a cross-sectional view of one embodiment of a pivoting fluid connection 108-A. The illustrated embodiment of a pivot mechanism 108-A is a dual-function device. The pivot mechanism 108-A provides for pivoting the skimmer 100 and also provides for a fluid connection between the skimmer 100 and the pump 106. The pivot mechanism 108-A includes a sleeve 602 that receives a bushing 604. The sleeve 602 is connected to the pump intake 402 and the bushing 604 is connected to the conduit 116. The bushing 604 is hollow and provides a fluid passage between the conduit 116 and the pump 106.

The sleeve 602 has an inside bore that is dimensioned to receive the bushing 604 and allow the bushing 604 to rotate inside the sleeve 602. A small clearance, or gap, is provided between the outside of the bushing 604 and the inside of the sleeve 602 in order to minimize the friction between the bushing 604 and sleeve 602. Because the pivot mechanism 108 is submerged in the fluid 102, the leakage caused by the clearance between the bushing 604 and the sleeve 602 will reduce the amount of fluid 102 flowing through the suction port 110, but, typically, the reduction will be slight. The leakage keeps the gap between the bushing 604 and the sleeve 602 clear and clean of debris and also helps to lubricate the pivot mechanism 108-A as it rotates.

The sleeve 602 has a slot 608 through which a pin 606 passes and engages an opening 610 in the bushing 604. The pin 606 is a protrusion from bushing 604 that engages the slot 608 in the sleeve 602. The slot 608 is sized to limit the range, or angle, of rotation of the bushing 604 in the sleeve 602. In one embodiment, the pin 606 is a fastener that engages the opening 610 in the bushing 604. In other embodiments, the pin 606 is fixed to the bushing 604 by an adhesive, a weld, or other means for attaching.

With the sleeve 602 connected to the pump intake 402, the suction on the pivot mechanism 108-A tends to draw the bushing 604 into the sleeve 602. In one embodiment, the pin 606 restrains the axial movement of the bushing 604 relative to the sleeve 604. In order to allow the use of a less strong pin 606 and to reduce the friction induced by the pin 606 against the inside of the slot 608, another embodiment uses the end of the bushing 604 inside the sleeve 602 to engage a shoulder 612 inside the sleeve 602. The shoulder 612 provides a bearing surface for the bushing 604 as the bushing 604 rotates inside the sleeve 602. The shoulder 612 also prevents the bushing 604 from being pulled into the sleeve 602 and prevents an axially aligned force from being applied to the pin 606.

Figure 8:
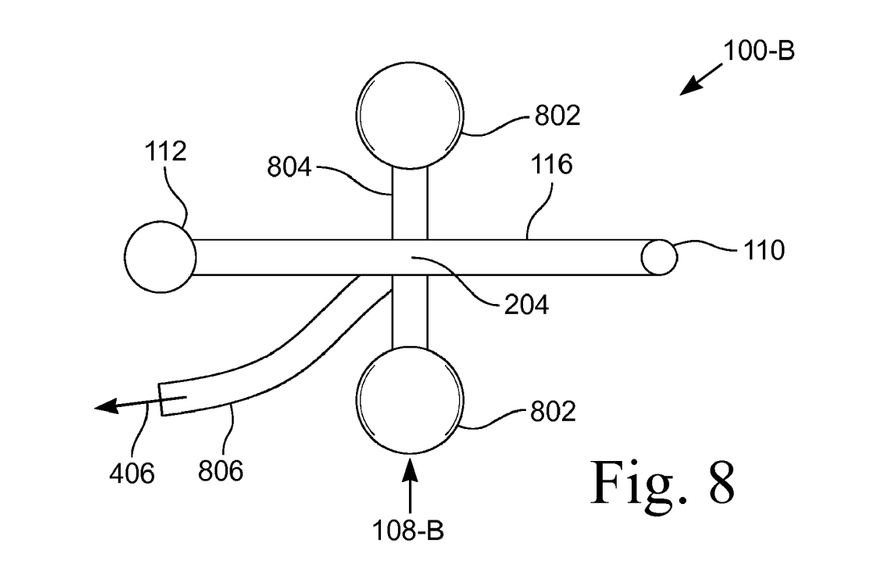
FIG. 8 is a top view of an embodiment of a skimmer with a pair of floats.
Figure 9:
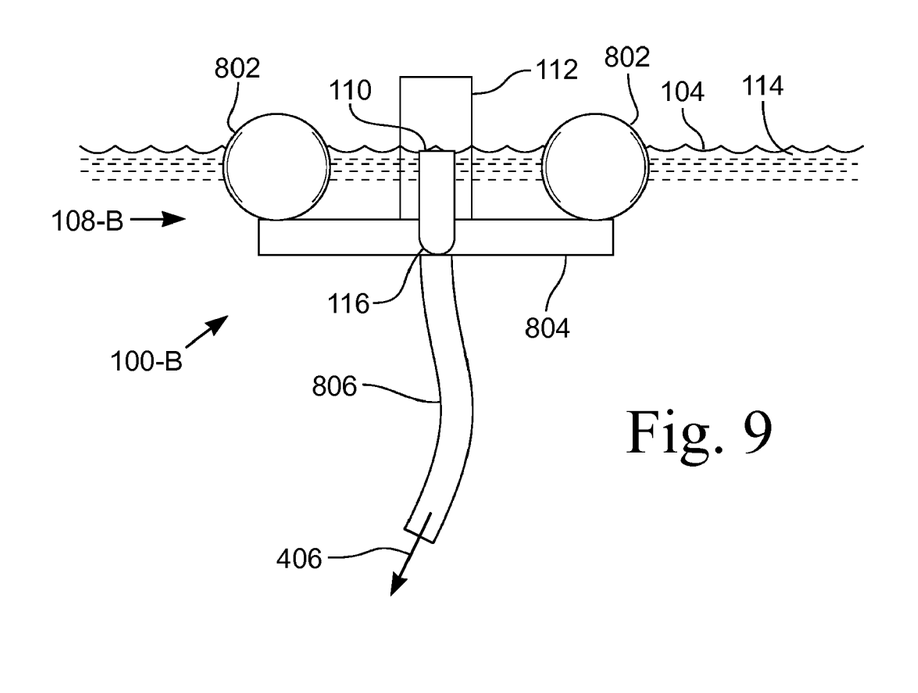
FIG. 9 is a side view of an embodiment of a skimmer with a pair of floats.

FIG. 8 illustrates a top view of an embodiment of a floating skimmer 100-B with a pair of floats 802. FIG. 9 illustrates a side view of an embodiment of a floating skimmer 100-B with a pair of floats 802. The floating skimmer 100-B includes a storage tank 112 and a suction port 110 connected with a conduit 116. Additionally, the floating skimmer 100-B includes a pair of floats 802 separated by a member, or arm, 804 that is attached to the conduit 116 adjacent the pivot point 204. The pair of floats 802 and the member 804 form a pivot mechanism 108-B between the conduit 116 and the surface 104 of the fluid. Attached to the conduit 116 is an outlet that is a flexible hose 806.

The floats 802 spaced apart by the member 804 provide a stable platform relative to the surface 104 of the fluid 102. The floats 802 are spherical in shape and allow the conduit 116 to pivot based on the buoyancy of the storage tank 112. The flexible hose 806 has one end attached to the conduit 116 and an opposite end in fluid communication with the pump 106, which is located remotely from the skimmer 100-B. The flow 406 from the skimmer 100-B is carried by the flexible hose 806. The flexible hose 806, because it is flexible, does not hinder the pivoting of the skimmer 100-B about the floats 802 and member 804 making up the pivot mechanism 108-B.

Figure 10:
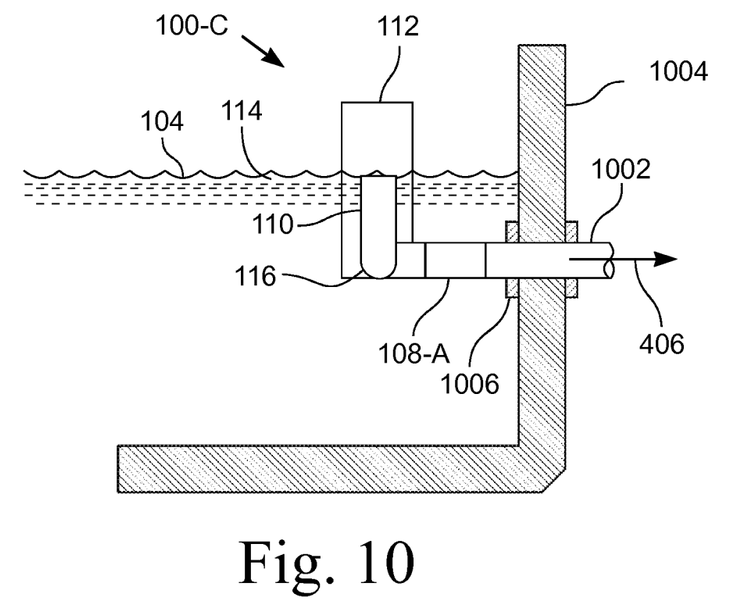
FIG. 10 is a side view of an embodiment of a skimmer in a tank.

FIG. 10 illustrates a side view of an embodiment of a skimmer 100-C in a tank 1004. Machine tools, such as CNC machines, use a recycled coolant. The coolant comes into contact with various oils and other contaminates that affect the operability of the coolant. Because the oils and many contaminants have a lower density than the coolant, they float or are found within a top layer 114 of the fluid 102. Typically the coolant is at a high temperature and contains toxic or corrosive materials. In the illustrated embodiment, a skimmer 100-C is contained within a tank 1004, such as one for receiving a coolant collected from a machine tool that contains a fluid 102 with an upper layer 114 to be removed from the tank 1004.

The skimmer 100-C includes a storage tank 112 connected to a suction port 110 via a conduit 116. The conduit is connected to a pivot mechanism 108-A that is attached to a pipe 1002 that passes through a penetration 1006 in the tank 1004. In one embodiment, the penetration 1006 is positioned at an elevation such that the suction port 110 is located at the surface 104 with the conduit 116 being substantially level and the skimmer 100-C balanced. The pipe 1002 is connected to a pump 106 outside the tank 1004, which allows for the use of a general purpose pump 106 and not one that is capable of withstanding the environment inside the tank 1004.

Figure 11:
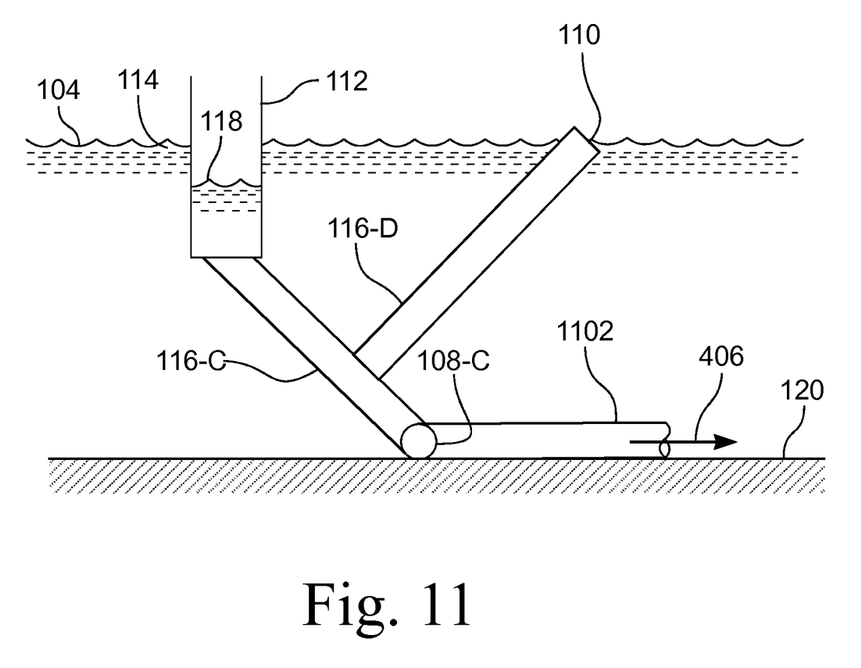
FIG. 11 is a side view of another embodiment of a skimmer.
Figure 12:
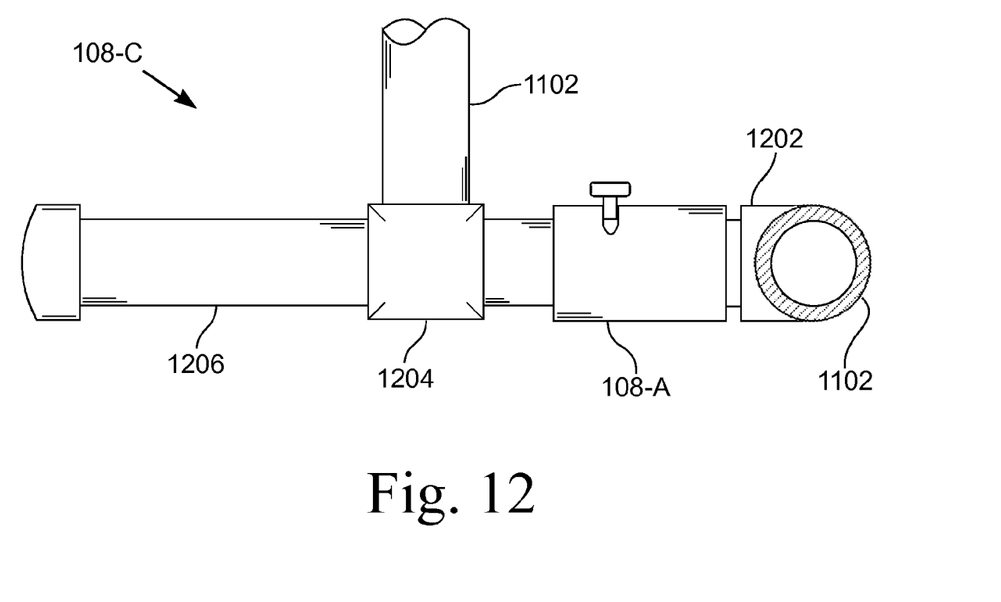
FIG. 12 is a partial view of another embodiment of a pivot mechanism.

FIG. 11 illustrates a side view of another embodiment of a skimmer 100-D. FIG. 12 illustrates a partial view of one embodiment of a pivot mechanism assembly 108-C. The storage tank 112 and the suction port 110 are connected with a pair of conduits 116-C, 116-D. The first conduit 116-C is connected to the storage tank 112 at one end and to the pivot mechanism 108-C at the other end. The second conduit 116-D has one end connected to the suction port 110 and the other end connected to the first conduit 116-C. The two conduits 116-C, 116-D together form a rigid structure that acts similarly to the single conduit 116 of the embodiments illustrated in FIGS. 1, 4, 5, 8, and 9.

The pivot mechanism assembly 108-C is adjacent the bottom 120 with a pipe 1102 leading to the pump 106. The pivot mechanism assembly 108-C includes a T-fitting 1204 connecting the first conduit 116-C to a capped extension pipe 1206 and to a pivot mechanism 108-A that is connected to an elbow fitting 1202. The pivot mechanism 108-A is positioned transversely to the first conduit 116-C and the pipe 1102.

The first conduit 116-C is connected to the pivot mechanism 108-C by a T-fitting 1204 and the pipe 1102 is connected to the pivot mechanism 108-C by an elbow 1202. The weight of the pipes 1102, 1206, the fittings 1202, 1204, and the pivot mechanism 108-A plus the length of the extension pipe 1206 and the pivot mechanism 108-A provide lateral stability to the skimmer 100-D to prevent its tipping. In another embodiment, the pivot mechanism assembly 108-C is secured to the bottom 120, such was with pipe clamps, adhesive, or other securing means.

The skimmer 100 includes various functions. The function of keeping the suction port 110 level with the fluid surface 104 is implemented, in one embodiment, by the storage tank 112 spaced apart from the suction port 110 by the conduit 116, which provides fluid communication between the storage tank 112 and the suction port 110, and the pivot mechanism 108 that allows the tank 112, suction port 110, and conduit 116 to move as a seesaw. Fluid 102 flowing into the storage tank 112 from the suction port 110 affects the buoyancy of the storage tank 112, which controls the position of the suction port 110 relative to the surface 104 of the fluid 102.

The function of maintaining a constant flow rate through the skimmer 100 is implemented, in one embodiment, by the suction port 110 maintaining a substantially constant relationship with the surface 104 of the fluid 102. For those instances when the suction port 110 is above the surface 104, the fluid 102 in the storage tank 112 provides a supply of fluid 102 for the pump 106.

The function of pivoting the conduit 116 is implemented by the pivot mechanism 108. In one embodiment, the pivot mechanism 108-A includes a tubular member, or bushing, 604 rotating within another tubular member, or sleeve, 602 and the tubular members 602, 604 also provide a fluid connection between the skimmer 100 and the pump 106. In another embodiment, the pivot mechanism 108-B does not include a fluid connection. In such an embodiment, the pivot mechanism 108-B includes a pair of floats 802 joined with an arm 804 and the arm 804 is attached to the conduit 116 adjacent the pivot 204.

From the foregoing description, it will be recognized by those skilled in the art that a skimmer 100 that compensates for variations in fluid level has been provided. The skimmer 100 includes a tank 112 that buoyantly follows the level of the fluid 102. The tank 112 is fluidly connected to a suction port 110 by a conduit 116. The tank 112, conduit 116, and suction port 110 form an assembly that pivots in order to keep the suction port 110 in a fixed relationship with the surface 104 of the fluid 102. The buoyancy of the tank 112 that is positioned on the opposite side of the pivot 204 from the suction port 110 provides the force that positions the suction port 110 adjacent the surface 104 of the fluid 102.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for skimming liquid from a surface, said apparatus comprising:
   a suction port having an open end configured to receive a fluid;
   a conduit having a first end and a second end, said first end of said conduit in fluid communication with said suction port;
   a storage tank in fluid communication with said second end of said conduit, said storage tank separated from said suction port by said conduit, said storage tank configured to receive said fluid from said suction port, said storage tank having an opening that prevents a differential pressure from developing between an inside and an outside of said storage tank, said storage tank configured to be partially submerged in said fluid with said suction port adjacent to a surface of said fluid;
   an outlet in fluid communication with said conduit, said fluid flowing by gravity into said outlet from said suction port and said storage tank; and
   a pivot mechanism attached to said conduit adjacent a pivoting axis whereby said storage tank moves in a substantially vertical direction and said suction port moves in an opposite vertical direction when said conduit pivots, said pivot mechanism configured to position said pivoting axis below said surface of said fluid when said suction port is adjacent said surface of said fluid, and a location of said pivoting axis being immovable relative to said surface of said fluid such that said location of said pivoting axis does not change when a level of said surface of said fluid changes.

2. The apparatus of claim 1 further including a pump having an intake in fluid communication with said outlet, said pump receiving a prime from said outlet and said pump supporting said pivot mechanism below said surface of said fluid.

3. The apparatus of claim 1 further including a pump having an intake in fluid communication with said outlet, said intake mechanically connected to said pivot mechanism, and said pump supporting said pivot mechanism.

4. The apparatus of claim 1 wherein said pivot mechanism includes a bushing and a sleeve, said bushing rotatably received by said sleeve, and said bushing having an axis of rotation that is coaxial with said pivoting axis, and said pivot mechanism further includes a gap between said bushing and said sleeve, said gap dimensioned to allow said pump to draw said fluid between said bushing and said sleeve to provide lubrication of said pivot mechanism.

5. The apparatus of claim 4 wherein said bushing includes a protrusion and said sleeve includes a slot, said protrusion engaging said slot to limit an angle of rotation of said bushing in said sleeve.

6. The apparatus of claim 4 wherein said sleeve includes a shoulder inside a bore in said sleeve, said bushing having an end that engages said shoulder when said bushing is received by said bore of said sleeve.

7. The apparatus of claim 1 wherein said pivot mechanism includes a hollow passage forming a portion of said outlet.

8. An apparatus for skimming liquid from a surface, said apparatus comprising:
- a first member having a fluid passage between a first end and a second end, said second end having an opening configured to receive a fluid;
- a conduit having a first conduit end and a second conduit end, said first conduit end in fluid communication with said first end of said first member, said conduit having an outlet between said first conduit end and said second conduit end;
- a second member having a fluid passage between a first end and a second end, said first end of said second member in fluid communication with said second conduit end, said second member substantially parallel to said first member whereby said first member, said conduit, and said second member have a generally U-shape, said second end of said second member disposed a greater distance from said conduit than said second end of said first member;
- a pivot mechanism attached to said conduit, said pivot mechanism including a bushing and a sleeve, said bushing rotatably received by said sleeve, said bushing having an axis of rotation that is coaxial with a pivoting axis of said conduit; and whereby said pivot mechanism and said conduit are configured to be disposed in said fluid with said second end of said first member positioned adjacent a surface of said fluid and said second end of said second member positioned above said surface, and said second end of said first member receiving said fluid, which flows into said second member and said outlet, said pivot mechanism configured to position said pivoting axis below said surface of said fluid when said second end of said first member is adjacent said surface of said fluid, and a location of said pivoting axis being immovable relative to said surface of said fluid such that said location of said pivoting axis does not change when a level of said surface of said fluid changes.

9. The apparatus of claim 8 further including a pump having an intake in fluid communication with said outlet, said pump receiving a prime from said outlet and said pump supporting said pivot mechanism below said surface of said fluid.

10. The apparatus of claim 8 further including a pump having an intake in fluid communication with said outlet, said intake mechanically attached to said pivot mechanism, and said pump supporting said pivot mechanism.

11. The apparatus of claim 8 wherein said bushing includes a protrusion and said sleeve includes a slot, said protrusion engaging said slot to limit an angle of rotation of said bushing in said sleeve.

12. The apparatus of claim 8 wherein said sleeve includes a shoulder inside a bore in said sleeve, said bushing having an end that engages said shoulder when said bushing is received by said bore of said sleeve.

13. The apparatus of claim 8 wherein said pivot mechanism includes a hollow passage forming a portion of said outlet, and said pivot mechanism further includes a gap between said bushing and said sleeve, said gap dimensioned to allow a pump to draw said fluid between said bushing and said sleeve to provide lubrication of said pivot mechanism.

* * * * *